United States Patent
Totsuka

(10) Patent No.: US 10,265,969 B2
(45) Date of Patent: Apr. 23, 2019

(54) IMAGE PROCESSING DEVICE, IMAGE PROCESSING METHOD AND STORAGE MEDIUM

(71) Applicant: CANON KABUSHIKI KAISHA, Tokyo (JP)

(72) Inventor: Atsushi Totsuka, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/655,672

(22) Filed: Jul. 20, 2017

(65) Prior Publication Data

US 2018/0029384 A1    Feb. 1, 2018

(30) Foreign Application Priority Data

Jul. 28, 2016  (JP) ................................. 2016-148208

(51) Int. Cl.
| | |
|---|---|
| H04N 1/00 | (2006.01) |
| B41J 11/00 | (2006.01) |
| B41J 2/205 | (2006.01) |
| G06K 15/00 | (2006.01) |

(52) U.S. Cl.
CPC ......... *B41J 11/0015* (2013.01); *B41J 2/2052* (2013.01); *G06K 15/00* (2013.01); *H04N 1/00* (2013.01)

(58) Field of Classification Search
USPC ........................................................ 358/1.14
See application file for complete search history.

(56) References Cited

U.S. PATENT DOCUMENTS

| | | | |
|---|---|---|---|
| 2002/0067496 A1* | 6/2002 | Nishikata | G06K 15/00 358/1.13 |
| 2003/0025927 A1* | 2/2003 | Hino | H04N 1/00 358/1.13 |
| 2012/0038703 A1* | 2/2012 | Taya | B41J 2/2114 347/20 |

FOREIGN PATENT DOCUMENTS

JP        2001-157056 A     6/2001

* cited by examiner

*Primary Examiner* — Neil R McLean
*Assistant Examiner* — Darryl V Dottin
(74) *Attorney, Agent, or Firm* — Canon USA, Inc., IP Division

(57) ABSTRACT

An image processing device generates data for forming an image by layering, on a printing medium, a first layer and a second layer. The image processing device includes a first acquisition unit configured to acquire first dot arrangement in the first layer formed by a gloss printing material, a second acquisition unit configured to acquire a printing amount of a color printing material for forming the second layer, and a halftone unit configured to perform halftone processing of converting the printing amount into second dot arrangement of the color printing material on the printing medium based on the first dot arrangement, wherein the halftone unit separately performs the halftone processing in a third area of the second layer and the halftone processing in a fourth area of the second layer based on the first dot arrangement.

23 Claims, 14 Drawing Sheets

| | * | 7 |
|---|---|---|
| 3 | 5 | 1 |

| | A | B |
|---|---|---|
| A | A | B |

| | * | 0 |
|---|---|---|
| 3 | 5 | 0 |

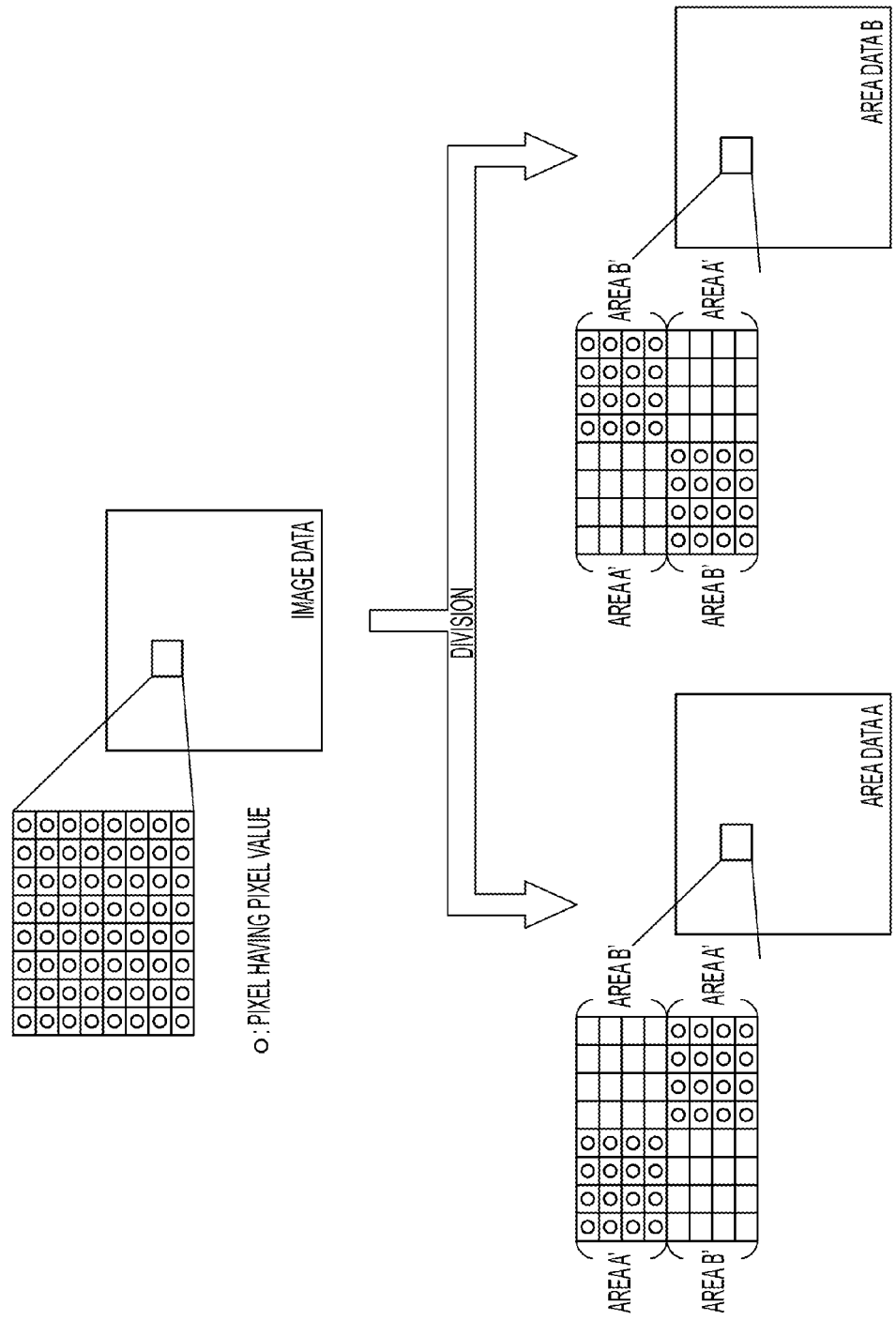

FIG. 14

| 0 | 0 | 0 | 0 | 0 | 0 | 0 | 0 |
|---|---|---|---|---|---|---|---|
| 0 | 1 | 1 | 1 | 1 | 1 | 1 | 0 |
| 0 | 1 | 2 | 2 | 2 | 2 | 1 | 0 |
| 0 | 1 | 2 | 3 | 3 | 2 | 1 | 0 |
| 0 | 1 | 2 | 3 | 3 | 2 | 1 | 0 |
| 0 | 1 | 2 | 2 | 2 | 2 | 1 | 0 |
| 0 | 1 | 1 | 1 | 1 | 1 | 1 | 0 |
| 0 | 0 | 0 | 0 | 0 | 0 | 0 | 0 |

IMAGE PROCESSING DEVICE, IMAGE PROCESSING METHOD AND STORAGE MEDIUM

BACKGROUND

Field of the Disclosure

The present disclosure generally relates to image processing and, more particularly, to an image processing device, an image processing method, a storage medium, and an image processing technique in which an image is formed by layering a color material layer and a gloss printing layer on a printing medium.

Description of the Related Art

In general, reproduction of an image on a printing medium by using an ink jet printer or the like involves halftone (HT) processing that determines dot arrangement of ink provided in the printer. When such HT processing is performed, it is necessary to prevent an unexpected regular pattern (artifact) such as moire from appearing. Japanese Patent Laid-Open No. 2001-157056 discloses the feature of HT processing that uses an error diffusion method, wherein an error is diffused in an outline direction detected in an image.

Meanwhile, printers, each of which reproduces gloss as well as color on a printing medium by providing a gloss ink such as a clear ink and a silver ink, are coming into widespread use. These printers each reproduce the color and the gloss by layering a color material layer formed by a color ink and a gloss printing layer formed by a gloss ink on a printing medium. When the gloss printing layer has a gloss that differs on an area basis while the color material layer has a color that differs on an area basis, in order to reproduce the color and the gloss with high accuracy, when each layer is formed, it is necessary to adjust an ink-dot discharge position on the basis of a position of an ink dot to be discharged to the other layer. However, in Japanese Patent Laid-Open No. 2001-157056, a position at which an ink dot is discharged is determined by referring only to a color image. Therefore, when the color material layer and the gloss printing layer are formed according to Japanese Patent Laid-Open No. 2001-157056, there arises a problem that a color-ink dot and a gloss-ink dot do not overlap with each other in an intended combination, and therefore the color and the gloss cannot be reproduced with high accuracy.

SUMMARY

The present disclosure has been made taking the above-described discussion into consideration, and one or more aspects of the present disclosure is capable of implementing processing for reproducing color and gloss with high accuracy in an image formed by layering a layer for expressing gloss and a layer for expressing color on a printing medium.

In order to address the above-described discussion, one or more aspects of the present disclosure provides an image processing device that generates data for forming an image by layering, on a printing medium, a first layer having a first area, and a second area that differs in gloss characteristics from the first area, and a second layer having a third area corresponding to the first area, and a fourth area corresponding to the second area, the image processing device including: a first acquisition unit configured to acquire first dot arrangement data corresponding to dot arrangement in the first layer formed by a gloss printing material for forming the first layer; a second acquisition unit configured to acquire image data that indicates a printing amount of a color printing material for forming the second layer, and in which the printing amount of the color printing material differs between the third area and the fourth area; and a halftone unit configured to perform halftone processing of converting the image data into second dot arrangement data corresponding to dot arrangement of the color printing material on the printing medium based on the dot arrangement data corresponding to the first dot arrangement data, wherein the halftone unit separately performs the halftone processing in the third area and the halftone processing in the fourth area based on the dot arrangement corresponding to the first dot arrangement data.

Further features of the present disclosure will become apparent from the following description of exemplary embodiments (with reference to the attached drawings).

BRIEF DESCRIPTION OF THE DRAWINGS

FIGS. 12A to 12C are drawings each illustrating an example of HT processing that uses an error diffusion method, and is performed by the HT unit.

FIG. 13 is a drawing illustrating an example of processing of generating area data by a first generation unit.

FIG. 14 is a drawing illustrating an example of processing of changing a threshold value of a dither matrix according to the distance from a boundary.

DESCRIPTION OF THE EMBODIMENTS

Embodiments for carrying out one or more aspects of the present disclosure will be described with reference to the accompanying drawings. However, components described in the embodiments are to be construed as merely illustrative, and the scope of the present disclosure is not necessarily limited to the embodiments.

[First Embodiment]

Figure 1:
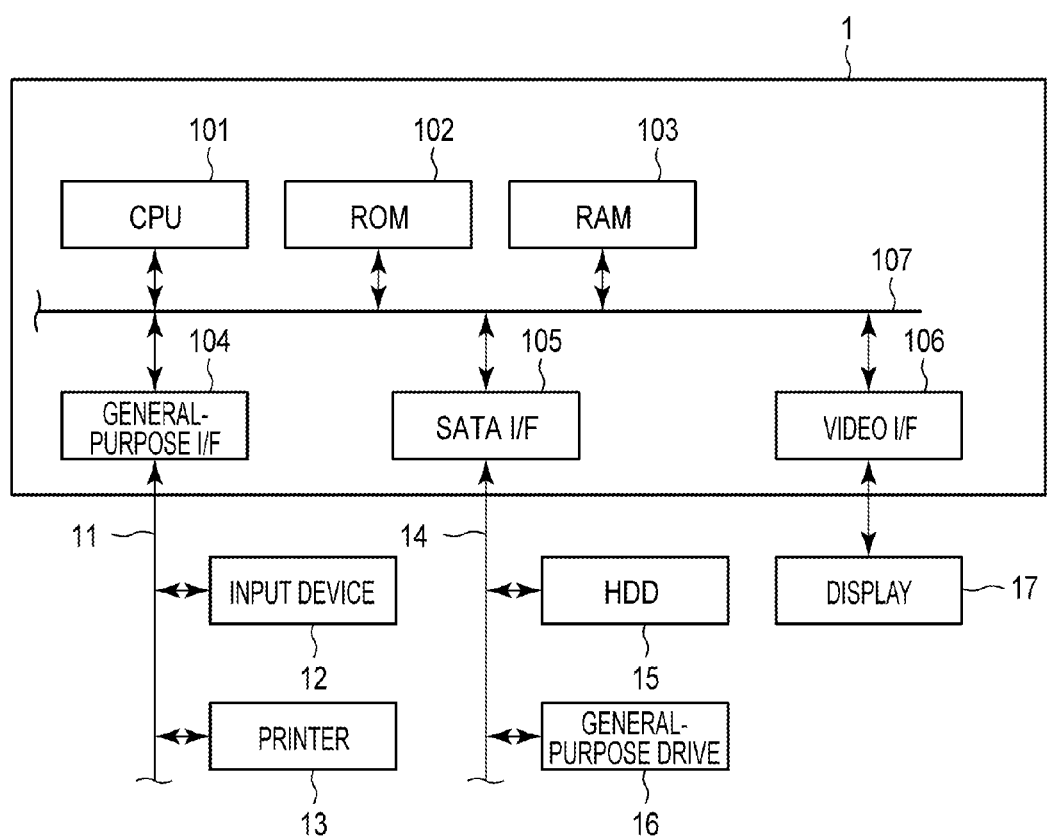
FIG. 1 is a block diagram illustrating a hardware configuration of an image processing device 1.

FIG. 1 illustrates a hardware configuration example of an image processing device 1 in the present embodiment. The image processing device 1 is, for example, a computer, and is provided with a CPU (central processing unit) 101, a ROM (read only memory) 102 and a RAM (random access memory) 103. The CPU 101, which may include one or more memories, one or more processors, circuitry, or a combination thereof, uses the RAM 103 as a working memory, and executes an OS (operating system) and a various kinds of programs. The OS and the programs are stored in the ROM 102 or a HDD (hard disk drive) 15. In addition, the CPU 101 controls each component through a system bus 107. Incidentally, with respect to processing of the undermentioned flowchart, a program code stored in the ROM 102 or the HDD 15 is expanded in the RAM 103, and is then executed by the CPU 101. An input device 12 such as a mouse and a keyboard, and a printer 13 are connected to a general-purpose I/F (interface) 104 through a serial bus 11. The HDD 15, and a general-purpose drive 16 for reading/writing from/to various kinds of recording media are connected to a SATA (serial advanced technology attachment) I/F 105 through a serial bus 14. The CPU 101 uses the various kinds of recording media, which are mounted to the HDD 15 and the general-purpose drive 16, as storage locations of various kinds of data. A display 17 is connected to a video I/F 106. The CPU 101 displays, on the display 17, a UI (user interface) provided by a program, and receives input, such as a user instruction, accepted through the input device 12.

Figure 2:
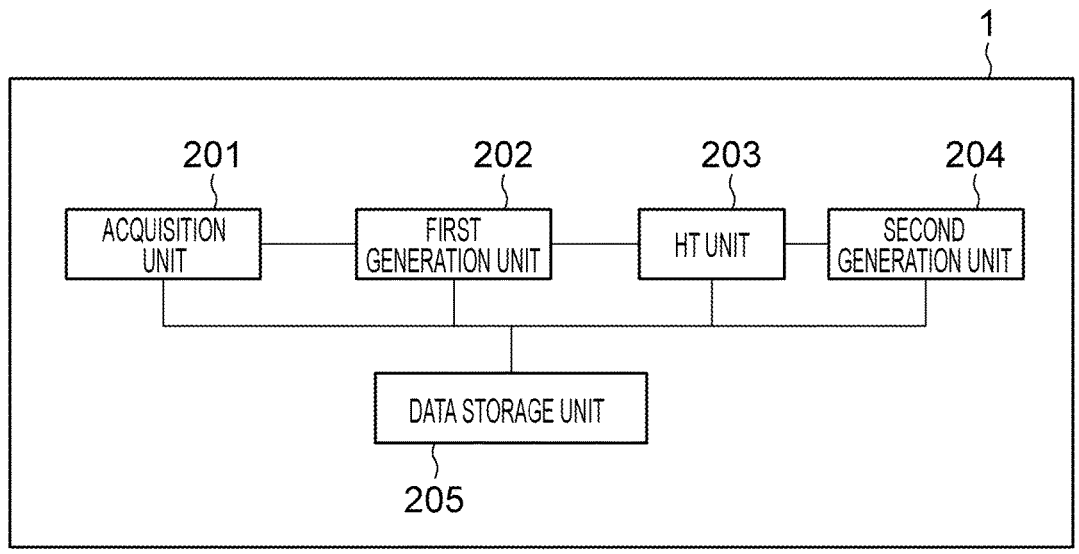
FIG. 2 is a block diagram illustrating a functional configuration of the image processing device 1.

FIG. 2 is a block diagram illustrating a functional configuration of the image processing device 1 in the present embodiment. How an image processing application included in the various kinds of programs described above is executed on the basis of an instruction from the CPU 101 will be described with reference to FIG. 2. The image processing device 1 includes an acquisition unit 201, a first generation unit 202, a halftone (HT) unit 203, a second generation unit 204 and a data storage unit 205. The acquisition unit 201 acquires image data and dot arrangement data of a gloss ink (gloss printing material), which have been instructed through the general-purpose I/F 104, from various kinds of recording media mounted to the HDD 15 and the general-purpose drive 16. The gloss ink is used for controlling the appearance of gloss of an image formed on a printing medium, and will be detailed later. On the basis of the gloss-ink dot arrangement data, the first generation unit 202 generates two pieces of area data from the image data acquired by the acquisition unit 201. The HT unit 203 performs halftone processing (HT processing), which is independently executed on an area data basis. The second generation unit 204 generates dot arrangement data of one colored ink (color printing material) with reference to each piece of area data. The data storage unit 205 stores beforehand information including a characteristic value of each ink provided in the printer 13. The detailed processing operation in each part will be described later.

The units described throughout the present disclosure are exemplary and/or preferable modules for implementing processes described in the present disclosure. The modules can be hardware units (such as circuitry, a field programmable gate array, a digital signal processor, an application specific integrated circuit or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

Figure 3:
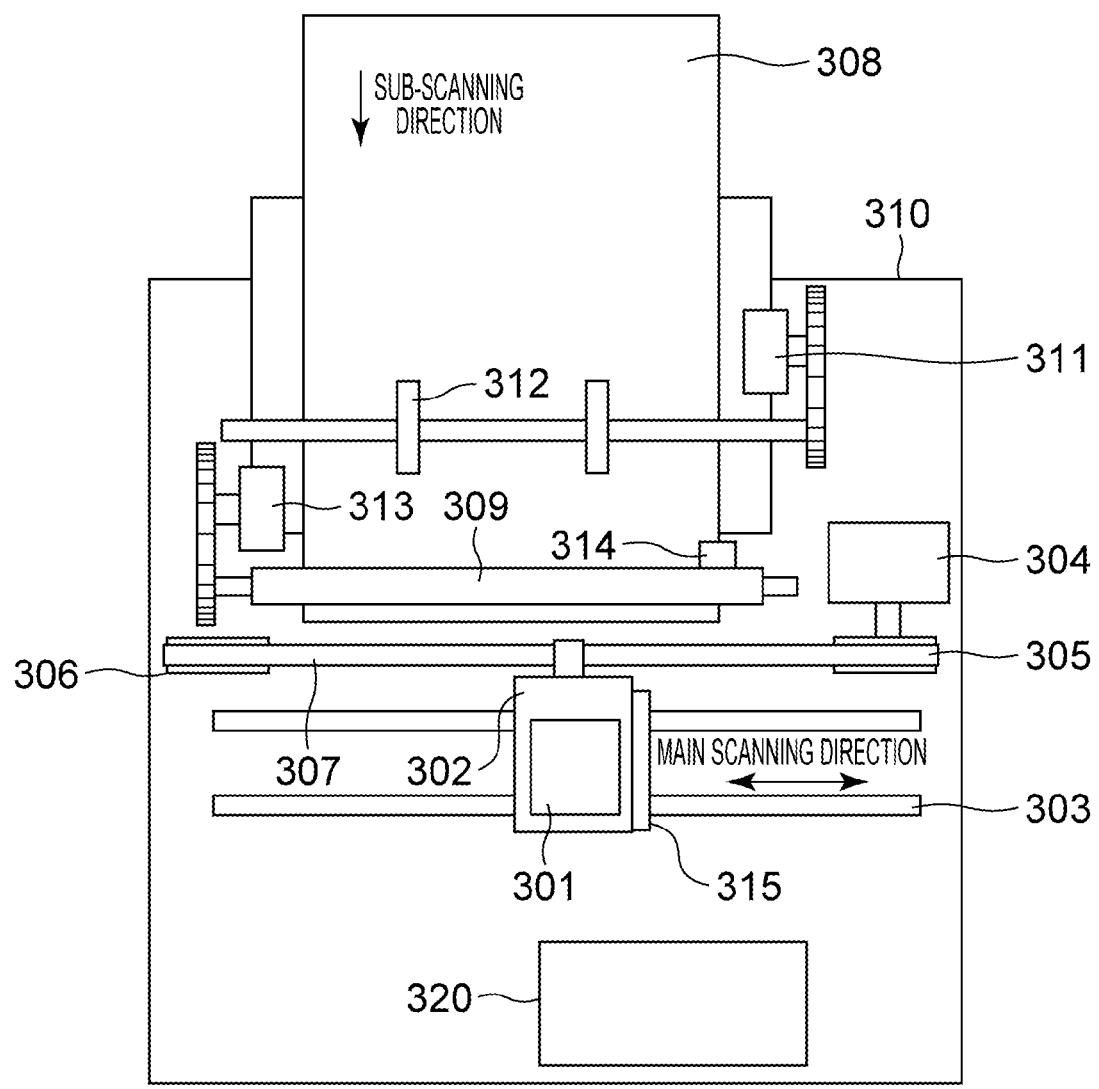
FIG. 3 is a diagram illustrating a configuration of a printer 13.

FIG. 3 is a diagram illustrating a configuration of the printer 13 that forms a color material layer and a gloss printing layer on a printing medium on the basis of gloss-ink dot arrangement data acquired by the acquisition unit 201 and colored-ink dot arrangement data generated by the second generation unit 204 in the image processing device 1 in the present embodiment. A head cartridge 301 is equipped with: a printing head composed of a plurality of discharge ports; an ink tank for supplying an ink to the printing head; and a connector for receiving a signal that drives each discharge port of the printing head. A carriage 302 is provided with the head cartridge 301 in a replaceable manner. The carriage 302 is provided with a connector holder that is used to transmit a driving signal and the like to the head cartridge 301 through the connector. The carriage 302 is configured to be reciprocatable along a guide shaft 303. More specifically, the carriage 302 is driven by a main scanning motor 304, which is a driving source, through a driving mechanism such as a motor pulley 305, a driven pulley 306 and a timing belt 307, and the position and movement of the carriage 302 are controlled. In the present embodiment, a movement of this carriage 302 along the guide shaft 303 is referred to as "main scanning", and a direction of movement is referred to as a "main scanning direction". A printing medium 308 used for printing is placed in an ASF (Automatic Sheet Feeder) 310. When an image is formed on the printing medium 308, driving of a paper feed motor 311 causes a pickup roller 312 to rotate, and consequently the printing medium 308 is separated and fed from the ASF 310 one by one. Moreover, the rotation of a conveyance roller 309 causes the printing medium 308 to be conveyed to a printing start position that faces a discharge port surface of the head cartridge 301 on the carriage 302. The conveyance roller 309 is driven by a line-feed motor 313, which is a driving source, through a gear. A determination as to whether or not the printing medium 308 has been fed, and a determination of a paper feeding position, are made when the printing medium 308 passes through an end sensor 314. The head cartridge 301 mounted to the carriage 302 is held in such a manner that the discharge port surface protrudes downward from the carriage 302, and is kept parallel to the printing medium 308. A control unit 320 is composed of a CPU, a storage unit and the like. The control unit 320 receives, from the outside, image data, the resolution (hereinafter referred to as "printer resolution") of which is based on printer characteristics, and controls the operation of each part on the basis of the image data. It should be noted that the image data indicates the gloss-ink dot arrangement data acquired by the acquisition unit 201 or the colored-ink dot arrangement data generated by the generation unit 204. The dot arrangement data is binary data, and each pixel stores binary information that represents two states based on whether or not an ink dot is discharged.

The operation of forming a color material layer and a gloss printing layer by each part controlled by the control unit 320 will be described below. First of all, the printing medium 308 is conveyed to a printing start position so as to form a gloss printing layer, the carriage 302 then moves over the printing medium 308 along the guide shaft 303, and during the movement, a gloss ink is discharged from the discharge port of the printing head. As soon as the carriage 302 moves to one end of the guide shaft 303, the conveyance roller 309 conveys the printing medium 308 in a direction perpendicular to the scanning direction of the carriage 302 by the predetermined amount. In the present embodiment, the conveyance of the printing medium 308 is referred to as "paper feeding" or "sub-scanning", and the conveyance direction is referred to as a "paper-feed direction" or a "sub-scanning direction". When the conveyance of the printing medium 308 in the sub-scanning direction by the predetermined amount is completed, the carriage 302 moves along the guide shaft 303 again. The scanning and paper feeding by the carriage 302 of the printing head are repeated in this manner. As the result, the gloss printing layer is formed on the whole printing medium 308. After the gloss printing layer is formed, the conveyance roller 309 returns the printing medium 308 to the printing start position, and a cyan ink, a magenta ink, a yellow ink and a black ink (CMYK) are each discharged on the gloss printing layer in a process similar to that of the formation of the gloss printing layer, thereby forming a color material layer. In order to simplify the description, it is assumed that the printing head of the printer 13 is controlled by a binary code based on whether or not an ink dot is discharged, and that dot arrangement data received by the printer 13 contains binary information corresponding to whether or not each ink is discharged. It should be noted that with respect to printers, each of which is equipped with a printing head capable of adjusting the individual ink discharge amounts, the present disclosure can also be applied to such printers in a similar manner by receiving binary data corresponding to the individual ink discharge amounts. Thus, the operation of the printer 13 is not limited to the above-described operation.

Figure 4:
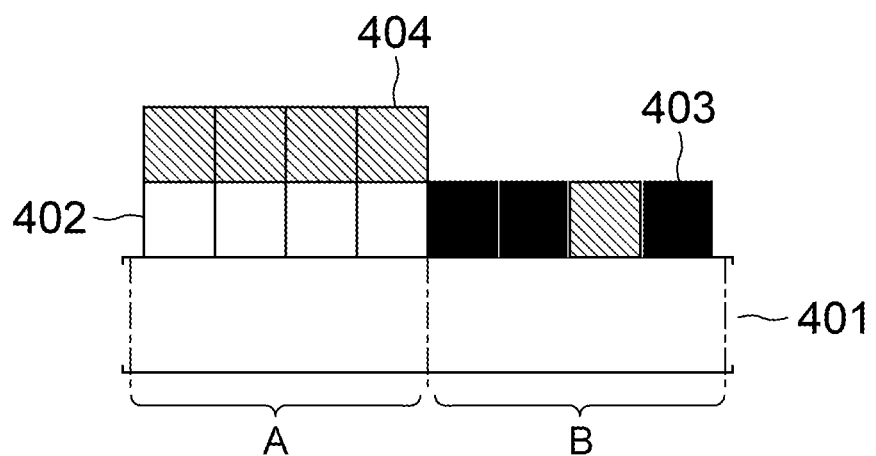
FIG. 4 is a schematic diagram of a cross section of an image formed on a printing medium.

FIG. 4 is a schematic diagram illustrating a cross section of a print formed by the printer 13 that has received gloss-ink dot arrangement data, and colored-ink dot arrangement data generated through the undermentioned processing, from the image processing device 1 in the present embodiment. In FIG. 4, reference numeral 401 denotes a silver medium, which is a printing medium used in the present embodiment. In addition, in the present embodiment, a white ink is employed as a gloss ink used for the formation of a gloss printing layer. Comparing a surface of a printing medium that is coated with the white ink with a surface of a printing medium that is not coated with the white ink, the surface of the printing medium coated with the white ink has a larger diffuse reflection component of reflected light. In other words, the glossiness of the white-ink coated surface is lower than that of the surface of the printing medium (silver medium) that is not coated with the white ink. In FIG. 4, rectangles 402 to 404 represent a white ink or a color ink, and the width of the rectangular corresponds to the size of one pixel of dot arrangement data (binary data) having a predetermined resolution received by the printer 13. In the present embodiment, it is assumed that the resolution of the printer is 1200 dpi, and the width of the rectangular is approximately 20 µm. Incidentally, a shape of a discharged ink dot is determined through the process of wet-spreading based on physical properties of inks and those of an ink landing surface. However, in order to simplify the description, the present embodiment is described on the assumption that inks fixed on the printing medium each have a rectangular shape. In FIG. 4, reference numeral 402 denotes a white ink, reference numeral 403 denotes a cyan ink, and reference numeral 404 denotes a yellow ink. As described above, an area A in which the silver medium 401 is coated with the white ink 402 has a larger diffuse reflection component of reflected light than an area B in which the silver medium 401 is not coated with the white ink 402. In the areas A and B, color inks, for example, the cyan ink 403 and the yellow ink 404, which differ in light absorption wavelength band from each other, are each arranged. Here, the areas A and B each have a size of 4×4 pixels, which is equivalent to approximately 80×80 µm, and each of the areas A and B is treated as a unit area for controlling gloss characteristics. In addition, an area having a size of 8×8 pixels, which is equivalent to approximately 160×160 µm and is constituted of 2×2 of the areas A and B, is treated as a unit area for controlling color characteristics. Incidentally, the unit area may be set at a different size in consideration of a decrease in reproducibility originated from the driving accuracy of the printing head. However, it is preferable that the size of such a unit area be set on the basis of viewing angle characteristics. When, for example, the visual acuity and the observation distance are E and D respectively, a viewing angle resolution S and a resolution R can be derived from the following formulas.

$$S = \tan\{(2 \times 3.14)/E/(360 \times 60)\} \times D \quad \text{(Formula 1)}$$

$$R = 25.4 \times 10^{-3}/S \quad \text{(Formula 2)}$$

According to Formulas 1 and 2, the viewing angle resolution corresponding to general observation conditions in which, for example, the least distance of distinct vision is 250 mm as the observation distance, and the visual acuity is 1.0, is calculated to be 80 µm. Therefore, the calculated size can be set as the size of the unit area for controlling color characteristics of reflected light. As the result, the unit area for controlling color characteristics of reflected light is perceived as one area, and therefore the deterioration in granularity is suppressed. Besides the above, the size may be determined on the basis of publicly-known viewing angle sensitivity characteristics by using, for example, a Barten model, or an appropriate size may be determined by performing a subjective evaluation experiment under geometric conditions in which a print formed in the present embodiment is observed.

Figure 5A:
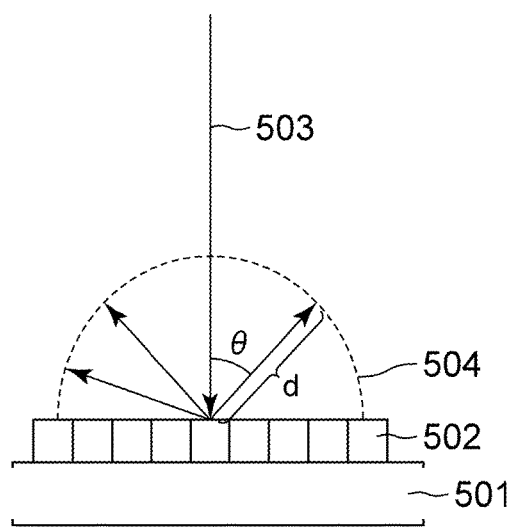
FIGS. 5A and 5B are drawings illustrating optical reflection characteristics of an image formed on a printing medium.
Figure 5B:
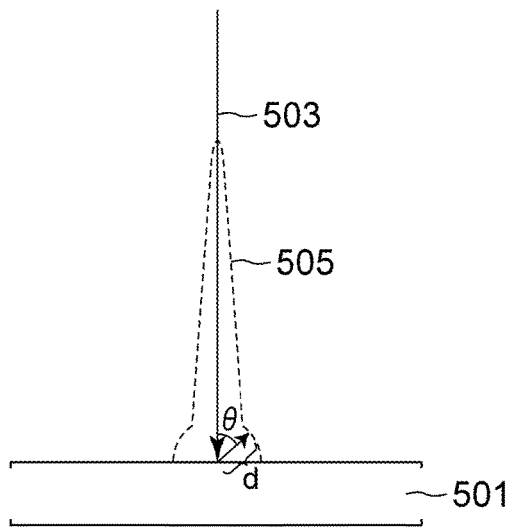

Next, a difference in gloss characteristics between the area A in which the silver medium is coated with the white ink and the area B in which the silver medium is not coated with the white ink will be described with reference to FIGS. 5A and 5B. FIG. 5A is a drawing schematically illustrating reflected light of the light 503 incident on a white ink 502 coating the silver medium 501. The intensity of the reflected light at an angle θ is expressed by the distance d to a broken line 504. In the area coated with the white ink having characteristics in which a diffuse reflection component is large, the light 503 is reflected with substantially uniform intensity irrespective of the angle θ as shown in FIG. 5A. FIG. 5B is a drawing schematically illustrating reflected light of the light 503 incident on the silver medium 501. The intensity of the reflected light at the angle θ is expressed by the distance d to a broken line 505. As shown in FIG. 5B, the silver medium 501 has a higher reflection intensity in a direction close to the specular reflection direction θ=0 in comparison with the surface coated with the white ink 502, and has a low reflection intensity in directions other than the direction close to the specular reflection direction. Incidentally, it is assumed that even in the areas A and B, each of which has the color ink arranged on the upper layer thereof, the relative relationship of the optical reflection characteristics is kept unchanged. In addition, if the areas A and B each have optical reflection characteristics in which the reflection intensity ratio between one direction and one of the other directions among incident light reflection directions differs from that of the other area, optical reflection characteristics are not limited to the optical reflection characteristics described above. However, it is more preferable that the optical reflection characteristics of each area be similar to those of a perfect diffusing reflection surface that reflects light with uniform intensity irrespective of an angle, and those of a mirror surface that reflects light only in the specular reflection direction.

Figure 6A:
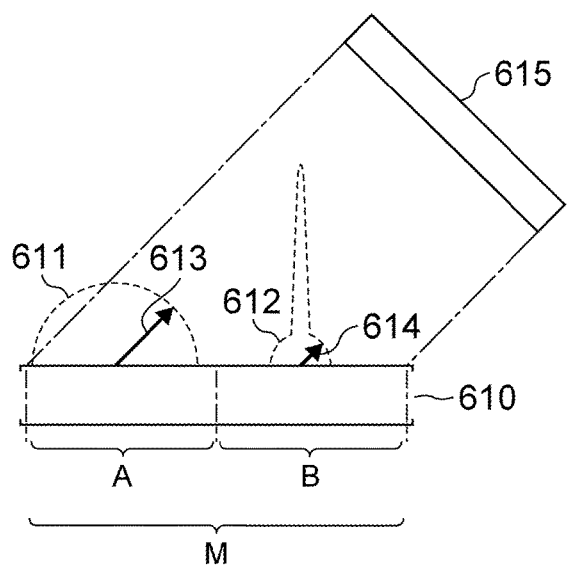
FIGS. 6A and 6B are drawings illustrating colors, which are seen in a specular reflection direction and in a non-specular reflection direction respectively, in an image formed on a printing medium.
Figure 6B:
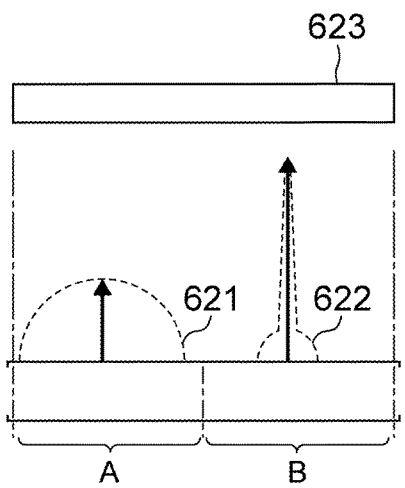

Next, a color difference visually recognized when a unit area for controlling color characteristics, that is to say, a macro area M that includes the area A and the area B, is observed in a non-specular reflection direction and in a specular reflection direction will be described with reference to FIGS. 6A and 6B. In FIGS. 6A and 6B, broken lines 611 and 612 each represent the intensity of reflected light obtained when light perpendicularly enters a print 610 in a manner similar to FIGS. 5A and 5B. When the area M is observed in a non-specular reflection direction 615 shown in FIG. 6A, a color obtained by adding a color of reflected light 613 and a color of reflected light 614 together is visually recognized. As described above, in the non-specular reflection direction, the reflected light 613 of the area A has a higher reflection intensity than that of the reflected light 614 of the area B, and therefore color appearance close to yellow that is a color of the reflected light of the area A can be visually recognized in the area M. The reason why not yellow but the color appearance close to yellow can be visually recognized is because green that is a combination of cyan and yellow, which are colors of the reflected light of the area B, slightly influences the visually recognized color. Similarly, when the area M is observed in the specular reflection direction 623 shown in FIG. 6B, colors of the reflected light, which are indicated by reference numerals 621 and 622 respectively, are added together, and therefore color appearance close to green that is a combination of cyan and yellow, which are colors of the reflected light of the area B, is visually recognized. In the case of the specular reflection direction as well, yellow that is the color of the reflected light of the area A slightly influences a visually recognized color in a similar manner, and therefore not green but the color appearance close to green can be visually recognized. It should be noted that although the above description has been made by using the cyan ink and the yellow ink, it is also possible to carry out similar control by using a color reproduced by color mixture based on an arbitrary combination of CMYK inks.

Figure 7A:
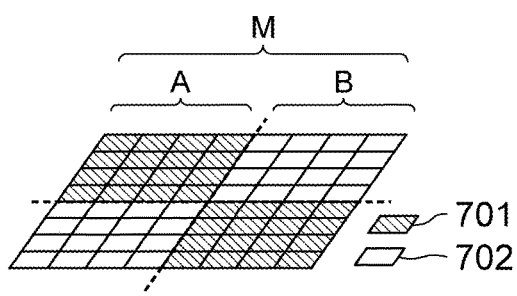
FIGS. 7A to 7D are drawings illustrating image data and gloss-ink dot arrangement data, both of which are acquired by an acquisition unit 201.
Figure 7B:
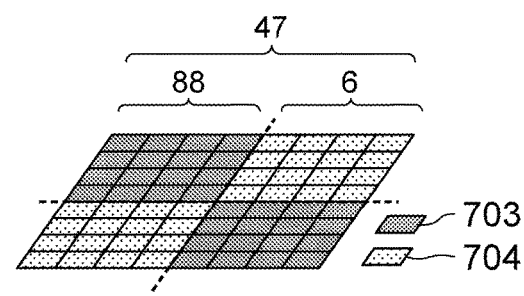
Figure 7C:
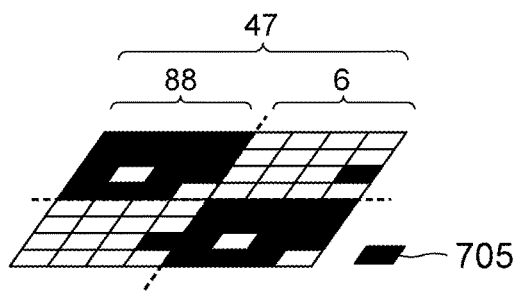
Figure 7D:
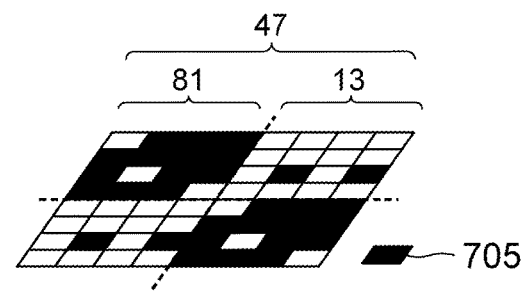

Image data and gloss-ink dot arrangement data that are obtained by the acquisition unit 201, and colored-ink dot arrangement data that is generated through the processing performed by the components from the first generation unit 202 to the second generation unit 204, in the present embodiment will be described below. FIG. 7A is a schematic diagram illustrating a configuration of gloss-ink dot arrangement data in which binary information indicating whether or not a gloss ink is discharged is recorded in each pixel. In FIG. 7A, reference numeral 701 that corresponds to the above-described area A indicates low glossiness, and reference numeral 702 that corresponds to the above-described area B indicates high glossiness. The present embodiment is based on the assumption that the dot arrangement data is composed of only the areas A and B that differ in gloss characteristics from each other as described above, and pixel values of the areas A and B are each associated beforehand with two states based on whether or not a white ink is discharged. FIG. 7B is a schematic diagram illustrating a configuration of image data in which information about color characteristics as a reproduction target is recorded in each pixel. The present embodiment is based on the assumption that the color characteristics are recorded by values ranging from 0 to 100% corresponding to the ink amounts of CMYK inks. FIG. 7B is a schematic diagram illustrating the ink amount of the yellow ink in each pixel. In the image data shown in FIG. 7B, "88" is recorded in a pixel 703 corresponding to the area A as the ink amount of the yellow ink, and "6" is recorded in a pixel 704 corresponding to the area B as the ink amount of the yellow ink. When the image data is binarized by HT processing, it is preferable that an area ratio of an area 705 in which an ink dot is discharged to an area in which an ink dot is not discharged correspond to the above-described ink amount in each of the areas A and B as shown in FIG. 7C. However, when the HT processing based on the conventional error diffusion method causes an error of the ink amount of the yellow ink in the area A to be diffused to the area B, there is a possibility that an area ratio of the area in which an ink dot is discharged to the area in which an ink dot is not discharged will not correspond to the above-described ink amount in each of the areas A and B. An example of this case is shown in FIG. 7D. In the example shown in FIG. 7D, the difference in color appearance caused by the yellow ink between the visual recognition in the specular reflection direction and the visual recognition in the non-specular reflection direction is narrowed. As the result, it is difficult to visually recognize a change in color appearance when the observation angle changes, or it is not possible to visually recognize the change in color appearance. Hereinafter, the difference in color appearance that occurs when the observation angle changes is referred to as color separability, and the above-described problem is expressed as a decrease in color separability. As described above, such a problem occurs in the conventional error diffusion method because the gloss characteristics to be reproduced on the printing medium are not taken into consideration.

Figure 8:
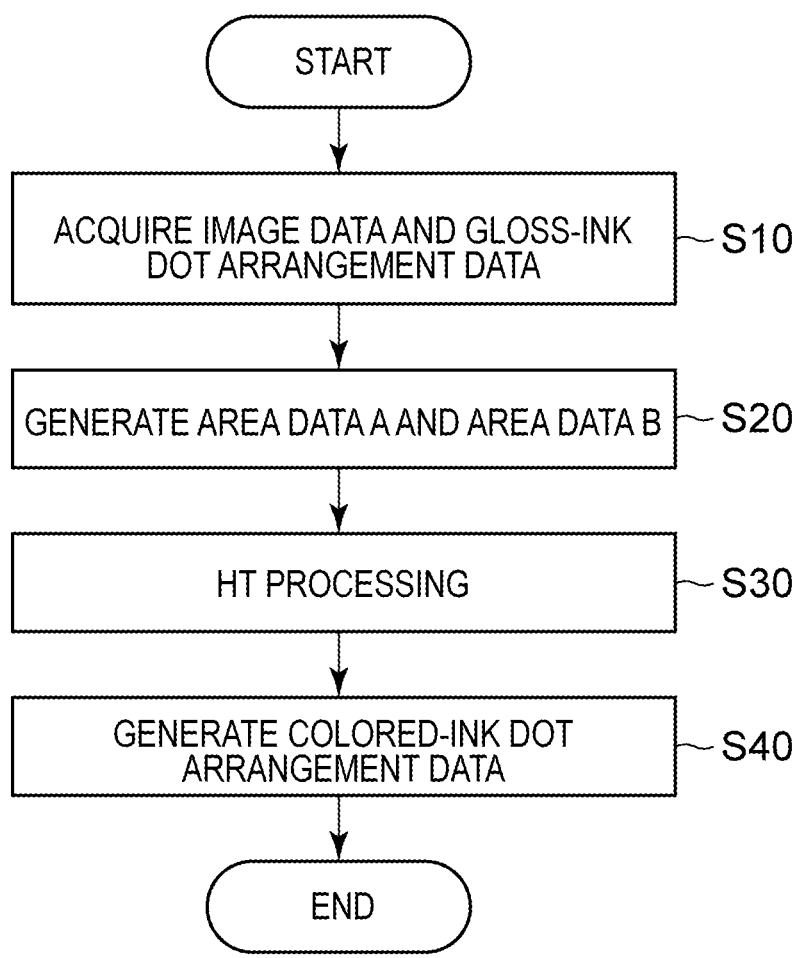
FIG. 8 is a flowchart illustrating processing of the image processing device 1.

A series of processing steps of the image processing device 1, which is performed to suppress the reduction in color separability caused by the HT processing, will be described below. FIG. 8 is a flowchart illustrating processing steps of the image processing device 1 in the present embodiment. The processing steps of the image processing device 1 in the present embodiment will be detailed below with reference to FIG. 8. Incidentally, with respect to the processing steps of the flowchart shown in FIG. 8, a program code stored in the ROM 102 is expanded in the RAM 103, and is then executed by the CPU 101. After a user operates the input device 12 to input an instruction, the flowchart shown in FIG. 8 is started when the CPU 101 accepts the inputted instruction. Hereinafter, each step (process) is represented by an S-prefixed number.

In S10, the acquisition unit 201 acquires image data and gloss-ink dot arrangement data. The data is recorded beforehand in a storage device such as the HDD 17. The image data and the gloss-ink dot arrangement data are generated by defining an arrangement pattern of two areas beforehand, and then by providing each arranged area with gloss characteristics and color characteristics through the input device 12. In the present embodiment, color image data shown in FIG. 7B is based on four channels that correspond to the ink amounts (the printing amounts) of the CMYK color inks provided in the printer respectively, and 8-bit (0-255) multi-value information is recorded in each pixel of each channel. The ink amounts indicated within a range from 0 to 100 corresponding to FIG. 7B are values obtained by normalizing the 8-bit recorded pixel values into a 0-to-100 scale respectively. It should be noted that image data in which color signals such as RGB values, which are defined in a sRGB space, are recorded in each pixel may be used. In this case, the CMYK ink amount is derived by using a color-separation lookup table, or a conversion matrix, in which the correspondence relationship between a RGB value and the CMYK ink amount is maintained, and a value normalized into a 0-to-100 scale is recorded in each pixel of the image data. In addition, the gloss-ink dot arrangement data shown in FIG. 7A is based on the assumption that binary information indicating whether or not the gloss ink is discharged is recorded in each pixel, and a gloss printing layer can be formed by receiving the gloss-ink dot arrangement data by the printer 13. It should be noted that gloss-ink dot arrangement data may be generated from data in which gloss characteristics such as optical reflection intensity and optical reflectance are recorded in each pixel. In this case, the gloss-ink dot arrangement data is generated by maintaining beforehand a lookup table for converting gloss characteristics into the amount of the gloss ink, and then by binarizing the converted gloss ink amount by the HT processing in the HT unit 203 described below.

In S20, from the image data acquired in S10, the first generation unit 202 generates two pieces of area data to which HT processing is separately applied. Hereinafter, the two pieces of area data are referred to as an "area data A" and an "area data B" respectively. First of all, mask data, which is used to identify an area corresponding to the area A (hereinafter referred to as an "area A'") and an area corresponding to the area B (hereinafter referred to as an "area B'") in the image data, is generated with reference to the gloss-ink dot arrangement data. As shown in FIG. 13, the area data A in which only a pixel value of the area A' is recorded, and the area data B in which only a pixel value of the area B' is recorded, are generated from the image data by using the generated mask data. With respect to each pixel contained in the image data, the area data A and the area data B shown in FIG. 13, a pixel marked with a circle indicates a pixel having a pixel value, and the other pixels each indicate a pixel that does not have a pixel value. With respect to the mask data, first mask data used to generate the area data A, and second mask data which is used to generate the area data B, and in which pixel values in the area B' are replaced with pixel values in the area A' in the first mask data respectively, are used. It should be noted that data that have been generated beforehand on the basis of the gloss-ink dot arrangement data may be used as the mask data. Next, in order to subject each of the area data A and the area data B to error diffusion processing, the area B' in the area data A in which no pixel value is recorded, and the area A' in the area data B in which no pixel value is recorded, are subjected to pixel value interpolation. The publicly-known nearest neighbor interpolation in which a pixel value of a pixel to be interpolated is interpolated by a pixel value of the nearest neighbor pixel is used for the interpolation processing. It should be noted that the interpolation may be performed by weighting, according to the distance from a target pixel, a degree of influence on the interpolation processing of a pixel having a pixel value in such a manner that a pixel value of a pixel that is closer to the target pixel exerts a stronger influence on a pixel value of the target pixel.

Incidentally, in a case where n-value gloss-ink dot arrangement data having n kinds of different gloss characteristics is used as well, area data 1 to n is similarly generated by generating mask data used to identify an area having a pixel in which gloss characteristics i are recorded, and areas other than the area. Alternatively, for the purpose of reducing the amount of data, even in the case of having n kinds of different gloss characteristics, mask data may be generated by dividing gloss-ink dot arrangement data into two pieces of data corresponding to the area A' and the area B' respectively by the publicly-known area division method, and by using the two pieces of data. The publicly-known area division method uses processing in which a threshold value is set, and data is divided into two pieces of data on the basis of the threshold value. The threshold value may be fixed, or may be unfixed by detecting, as a threshold value, a minimum value derived from the primary differentiation of a pixel value histogram, that is to say, a pixel value that corresponds to a position of a valley in the image histogram.

Figure 9A:
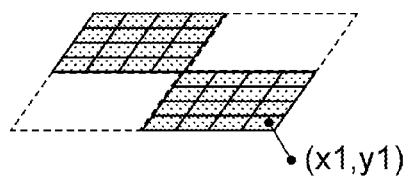
FIGS. 9A to 9F are drawings each illustrating an example of area data.
Figure 9D:
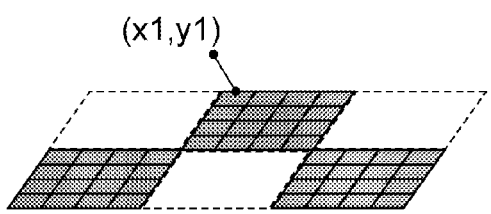
Figure 9B:
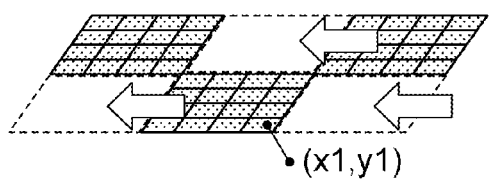
Figure 9E:
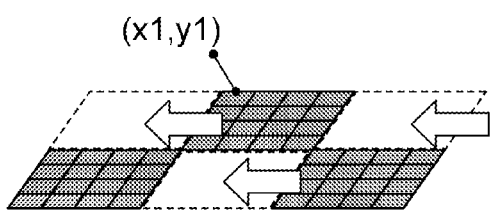
Figure 9C:
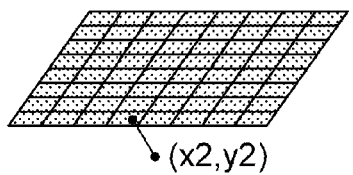
Figure 9F:
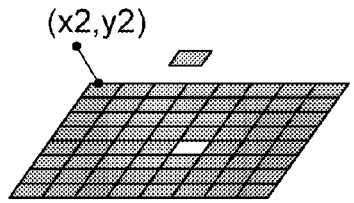

It is assumed that the interpolation processing in S20, and processing described in each of S30 and S40 described below are each performed for each channel of image data. It should be noted that the two pieces of area data to which the HT processing is applied may be generated by a method that differs from the above-described method. For example, when the area data A is generated, the area data A can also be generated by scanning image data, by extracting only pixels in the area A' without extracting pixels in the area B', and by using only pixels extracted without performing the interpolation processing. More specifically, in FIG. 9A, pixels in the area A' are extracted, and data as shown in FIG. 9C, which is generated by rearranging (left alignment or right alignment) the extracted pixels as shown in FIG. 9B, is used as the area data A. Similarly, in FIG. 9D, pixels in the area B' are extracted, and data as shown in FIG. 9F, which is generated by rearranging the extracted pixels as shown in FIG. 9E, is used as the area data B. In this case, for the use of the processing performed in S40 described below, the correspondence relationship between coordinates (x1, y1) of a pixel before the rearrangement and coordinates (x2, y2) of the pixel after the rearrangement is stored in the data storage unit 205.

In S30, the HT unit 203 subjects the area data A and the area data B, which have been generated in S20, to the HT processing (binarization processing) based on the error diffusion method, and generates binary area data A and binary area data B corresponding to the area data A and the area data B respectively. The error diffusion method is a method in which a value of a scanned target pixel is binarized while an image is scanned, and an error that occurs as the result of the binarization is diffused to un-scanned pixels close to the target pixel. It is assumed that a threshold value and diffusion coefficients, which are used for the processing, are stored in the data storage unit 205 beforehand. It should be noted that the diffusion coefficients may be adaptively determined according to values of neighboring pixels in the image data as shown in, for example, Japanese Patent Laid-Open No. 2001-157056. It should be noted that the binarization method in the HT unit may use a general dither matrix. In addition, in consideration of a positional deviation between the gloss printing layer and the color material layer caused by a deviation in ink landing position, which results from the driving accuracy of the printing head of the printer 13, it is more preferable that an ink dot not be arranged in an area close to the boundary (outline area) between the area A' and the area B'. For example, a distance from the boundary is calculated on a pixel basis, and a threshold value in the dither matrix is changed according to the distance in such a manner that an ink dot is apt to be arranged at coordinates that are spaced away from the boundary. This enables more suitable ink-dot arrangement to be achieved. More specifically, as shown in FIG. 14, a distance from the boundary is determined on a pixel basis, and a threshold value is changed. The number provided in each pixel indicates the number of pixels representing a distance from a boundary pixel in which 0 is provided. In the case of the error diffusion method as well, processing in which an ink dot is hardly arranged in an area close to the boundary can be performed by calculating a distance from the boundary, and by setting a higher threshold value with the decrease in distance, in a similar manner.

In S40, the second generation unit generates dot arrangement data of one colored ink with reference to the binary area data A and the binary area data B that have been generated in S30. More specifically, in a pixel in the area A', a pixel value at the same coordinates of the binary area data A is recorded, and in a pixel in the area B', a pixel value at the same coordinates of the binary area data B is recorded, thereby generating colored-ink dot arrangement data in which binary information is recorded in each pixel. Incidentally, in S20, in a case where the colored-ink dot arrangement data is generated by the method described with reference to FIGS. 9A to 9F, first of all, the correspondence relationship of coordinates stored beforehand is referred to. In addition, the colored-ink dot arrangement data can be generated by arranging a pixel at coordinates (x2, y2) in the binary area data at coordinates (x1, y1). With respect to the colored-ink dot arrangement data generated by the above-described series of processing, an error at the time of the binarization processing is not diffused to an area having different gloss characteristics. Therefore, color characteristics in each area, which are represented by multi-value image data acquired by the acquisition unit 201, can be more faithfully reproduced.

As described above, the image processing device 1 in the present embodiment generates two pieces of area data from the image data on the basis of the gloss-ink (white ink) dot arrangement data. Moreover, after the two pieces of area data are separately subjected to the HT processing, the image processing device 1 generates the colored-ink (CMYK ink) dot data on the basis of the two pieces of binary area data obtained from the HT processing. By forming the gloss printing layer and the color material layer on the basis of the gloss-ink dot arrangement data and the colored-ink dot arrangement data, the color and the gloss are reproduced on a printing medium with high accuracy, and a print in which the color separability is maintained can be formed.

[Second Embodiment]

In the first embodiment, as data of two kinds of areas to which the HT processing is individually applied, two pieces of area data are generated from image data on the basis of the gloss-ink dot arrangement data. The present embodiment describes a method in which an error diffusion method is used, and diffusion coefficients are corrected on the basis of gloss-ink dot arrangement data to control an area for diffusing an error. It should be noted that a functional configuration of the image processing device 1 in the present embodiment is the same as that in the first embodiment except the second generation unit 204, and a series of operation processing is executed by the acquisition unit 201, the first generation unit 202, the HT unit 203 and the data storage unit 205. Processing steps (S20 and S30) executed by the first generation unit 202 and the HT unit 203, which differ from those of the first embodiment, will be mainly described below.

First of all, in S10, the acquisition unit 201 acquires gloss-ink dot arrangement data and image data in a manner similar to that of the first embodiment. Next, in S20, on the basis of the gloss-ink dot arrangement data, the first generation unit generates mask data used to identify two areas, that is to say, an area A' and an area B', in the image data. In S30, the HT unit 203 subjects the image data acquired in S10 to the HT processing by referring to the mask data generated in S20. The processing operation will be detailed below.

Figure 11:
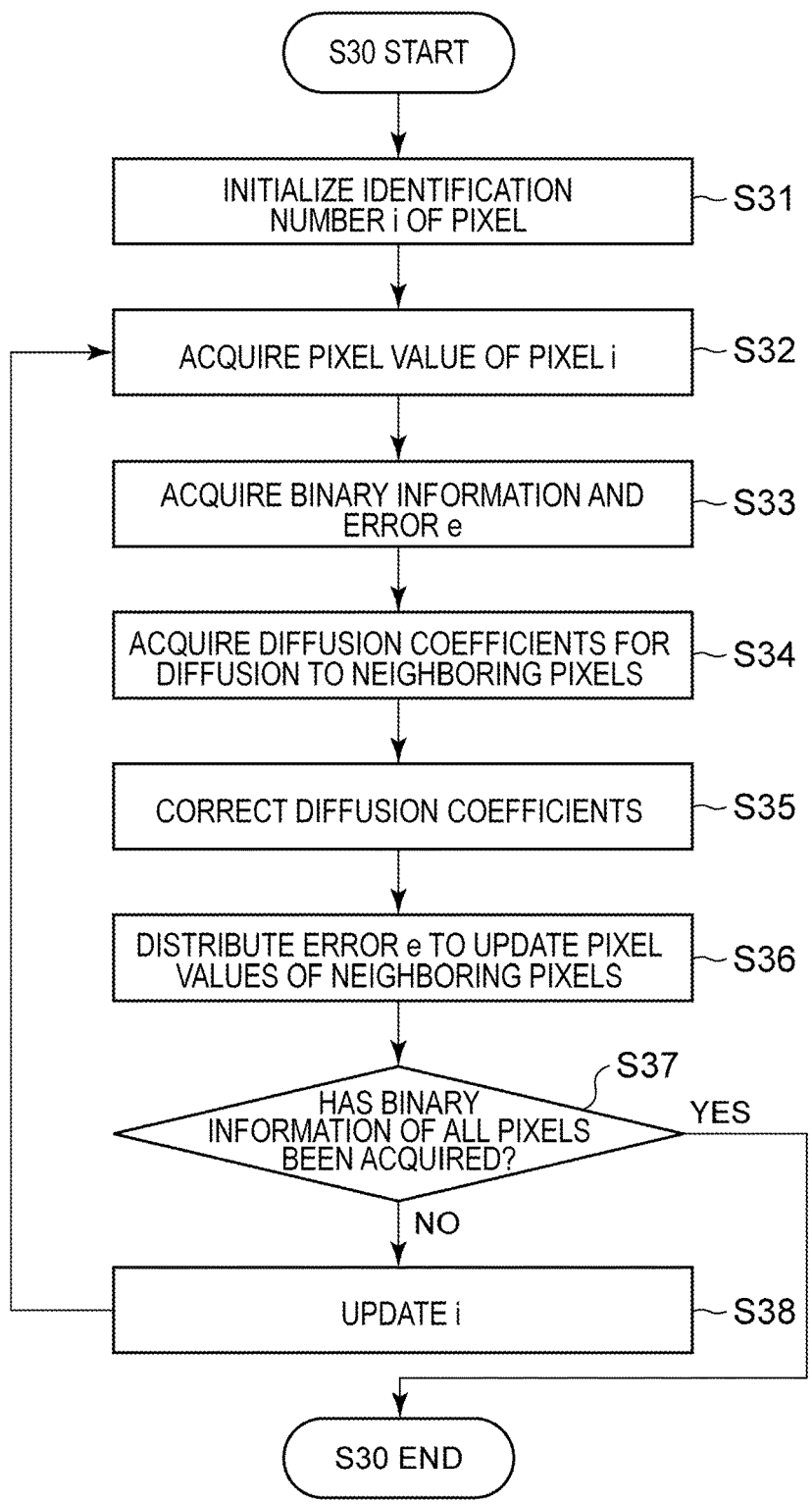
FIG. 11 is a flowchart illustrating processing performed by an HT unit.

FIG. 11 is a flowchart illustrating the processing step (S30) of the HT unit 203 in the present embodiment.

Figure 12A:
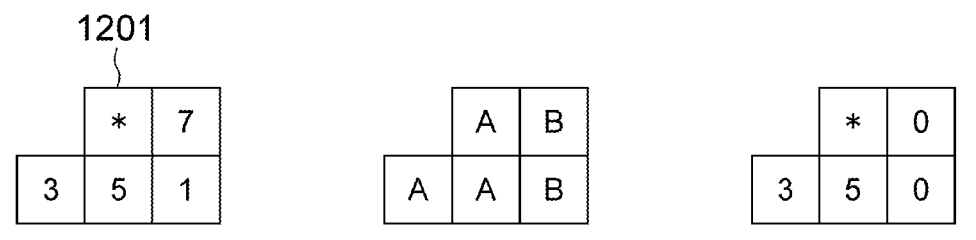

In S31, the HT unit 203 initializes an identification number i used to instruct a pixel in image data, and subsequently, in S32, the HT unit 203 acquires a pixel value of a pixel corresponding to the identification number i. Next, in S33, the HT unit 203 compares the pixel value with a predetermined threshold value to determine whether or not the pixel value is greater than or equal to the threshold value, and when the pixel value is greater than or equal to the threshold value, the HT unit 203 records 1 in the pixel i, whereas when the pixel value is smaller than the threshold value, the HT unit 203 records 0 in the pixel i. Concurrently with the above, the HT unit 203 maintains, as an error, a difference value e between the pixel value acquired in S32 and the threshold value. Next, in S34, the HT unit 203 acquires, from the data storage unit 205, diffusion coefficients recorded beforehand. In FIG. 12A, a pixel indicated by reference numeral 1201 is a target pixel, and numerical values in neighboring pixels are diffusion coefficients respectively. It should be noted that diffusion coefficients to be acquired, and the size of a neighboring-pixel formation are not limited to the above-described example. Next, in S35, the HT unit 203 refers to the mask data generated in the processing (S20) of the first generation unit 202, and corrects the diffusion coefficients. More specifically, the HT unit 203 refers to pixels of the mask data corresponding to the target pixel and the neighboring pixels, and determines whether each of the target pixel and the neighboring pixels is a pixel in the area A' or a pixel in the area B'. FIG. 12B shows an example of an area that includes a target pixel identified in mask data and neighboring pixels. A neighboring pixel that is identified as a pixel located in the same area as that of the target pixel, in other words, a neighboring pixel that is identified as a pixel located in the area A in the example shown in FIG. 12B, maintains a diffusion coefficient. When a neighboring pixel is identified as a pixel located in an area (area B) different from the area of the target pixel, the diffusion coefficient thereof is set at 0. FIG. 12C shows an example of diffusion coefficients after correction. Next, in S36, the HT unit 203 distributes the error e to the neighboring pixels on the basis of the diffusion coefficients after the correction. Here, the error that is diffused to each pixel is a value obtained by normalizing the sum total of the diffusion coefficients after the correction to 1, and then by multiplying the normalized value by the error e. The distributed errors are added to pixel values of the neighboring pixels, thereby updating the pixel values of the neighboring pixels. Subsequently, in S37, the HT unit 203 determines whether or not the processing described in S32 to S36 has been completed for all pixels. When an un-scanned pixel still remains, the HT unit 203 updates i in S38. After that, the process proceeds to the processing of S32. In S37, when it is determined that no un-scanned pixel exists, the binarization processing for all pixels in the image data is completed, and binary image data can be acquired as colored-ink dot arrangement data.

As described above, the image processing device 1 in the present embodiment uses the error diffusion method to correct diffusion coefficients on the basis of gloss-ink dot arrangement data, thereby controlling an area to which an error is diffused. By forming the gloss printing layer and the color material layer on the basis of the gloss-ink dot arrangement data and the colored-ink dot arrangement data, the color and the gloss are reproduced on a printing medium with high accuracy, and a print in which the color separability is maintained can be formed.

Other Embodiments

In the above-described embodiments, the gloss printing layer is a layer that is composed of an area in which a silver medium is coated with a white ink, and an area in which the silver medium is not coated with the white ink. However, the gloss printing layer is not limited to the above example. For example, the printer 13 is provided with, as a gloss ink, a silver ink that increases a specular reflection component of reflected light in an area coated therewith, and a medium having characteristics in which a diffuse reflection component of reflected light is large, such as a white medium and mat paper, is used as a printing medium. A layer which is formed by the printer 13 on the printing medium, and which is composed of an area that is coated with the silver ink and an area that is not coated with the silver ink, may be used as a gloss printing layer.

Figure 10A:
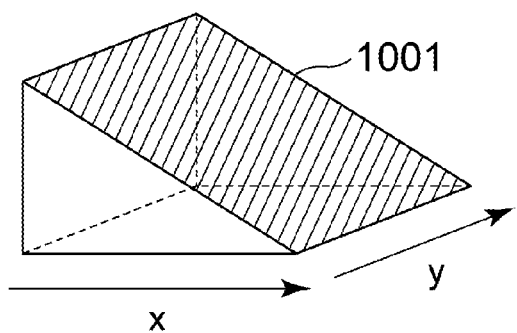
FIGS. 10A and 10B are drawings each illustrating an example of a gloss printing layer formed on a printing medium.
Figure 10B:
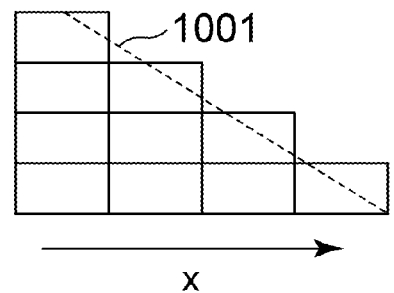

In addition, a mode may be employed in which not gloss-ink dot arrangement data but azimuth angle data is obtained, a value of an azimuth angle at which the reflection intensity of light is the maximum being recorded as a pixel value, and a structure is formed as a gloss printing layer on the basis of the azimuth angle. The structure indicates a minute convex formed by layering, for example, a clear ink, and has an inclined surface 1001 as shown in FIG. 10A. The structure is formed on a printing medium by layering ink dots, each of which is represented by a rectangle as shown in, for example, a schematic diagram of FIG. 10B, and then by smoothing the ink dots by wet-spreading of the ink. The printing amount of clear ink is determined by using a table in which the relationship between an azimuth angle recorded in the azimuth angle data and the printing amount of clear ink used to form a structure having an inclination that faces an azimuth angle close to the recorded azimuth angle is associated. The printer 13 forms a structure on the basis of the printing amount of clear ink. This processing enables a gloss printing layer, the gloss intensity of which differs depending on an observation angle to be formed. The clear ink used in this method is an ultraviolet (UV) cured ink, and the discharged clear ink is cured, and is firmly fixed to the printing medium, by using an ultraviolet irradiation device 315 shown in FIG. 3. Moreover, as a mode in which a structure is formed, a mode in which with respect to two layers, a color material layer and a gloss printing layer, the gloss printing layer is formed on the color material layer may be employed.

Further, in the above-described embodiments, the color material layer and the gloss printing layer are formed by employing ink-jet printing. However, other printing methods such as an electrophotographic method may be employed.

Furthermore, in the above-described embodiments, the CMYK ink is used as a color printing material. However, the color printing material is not limited to the above example. The present disclosure may use a CMYK toner, or may employ a configuration that uses, for example, a light cyan ink, the hue of which is close to that of the cyan ink, and the color density of which is lower than that of the cyan ink, or a light magenta ink, the hue of which is close to that of the magenta ink, and the color density of which is lower than that of the magenta ink.

According to the present disclosure, the color and the gloss can be reproduced with high accuracy in an image formed by layering a layer for expressing gloss and a layer for expressing color on a printing medium.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2016-148208, filed Jul. 28, 2016, which is hereby incorporated by reference herein in its entirety.

What is claimed is:

1. An image processing device that generates data for forming an image by layering, on a printing medium, a first layer having a first area, and a second area that differs in gloss characteristics from the first area, and a second layer having a third area corresponding to the first area, and a fourth area corresponding to the second area, the image processing device comprising:
   one or more memories storing instructions; and
   one or more processors which, when executing the instructions, causes the image processing device to function as:
   a first acquisition unit configured to acquire first dot arrangement data corresponding to dot arrangement in the first layer formed by a gloss printing material for forming the first layer;
   a second acquisition unit configured to acquire image data that indicates a printing amount of a color printing material for forming the second layer, and in which the printing amount of the color printing material differs between the third area and the fourth area; and
   a halftone unit configured to perform halftone processing of converting the image data into second dot arrangement data corresponding to dot arrangement of the color printing material on the printing medium based on the dot arrangement corresponding to the first dot arrangement data,
   wherein the halftone unit separately performs the halftone processing in the third area and the halftone processing in the fourth area based on the dot arrangement corresponding to the first dot arrangement data.

2. The image processing device according to claim 1, wherein the halftone unit performs the halftone processing by an error diffusion method.

3. The image processing device according to claim 2, wherein the halftone unit does not diffuse an error in the halftone processing for the third area to the fourth area, and does not diffuse an error in the halftone processing for the fourth area to the third area.

4. The image processing device according to claim 1, wherein
the gloss printing material is a printing material for controlling gloss on the printing medium, and
the color printing material is a color printing material.

5. The image processing device according to claim 1, wherein the gloss printing material is a printing material in which a diffuse reflection component of light reflected on an area coated with the gloss printing material is larger than a diffuse reflection component of the light reflected on the printing medium.

6. The image processing device according to claim 1, wherein
the gloss printing material is a white ink, and
the printing medium is a silver medium.

7. The image processing device according to claim 1, wherein the gloss printing material is a printing material in which a specular reflection component of light reflected on an area coated with the gloss printing material is larger than a specular reflection component of the light reflected on the printing medium.

8. The image processing device according to claim 1, wherein
the gloss printing material is a silver ink, and
the printing medium is a white medium.

9. The image processing device according to claim 1, wherein
the fourth area has a plurality of areas that correspond to respective different areas in the first layer, and
the halftone unit separately performs the halftone processing for each of the plurality of areas.

10. The image processing device according to claim 1, wherein the one or more processors, when executing the instructions, further causes the image processing device to function as:
a third acquisition unit that acquires reflection intensity or reflectance of incident light incident on the image;
a first determination unit that determines the printing amount of the gloss printing material based on the reflection intensity or the reflectance; and
a first generation unit that generates the first dot arrangement data based on the printing amount of the gloss printing material,
wherein the first acquisition unit acquires the first dot arrangement data generated by the first generation unit.

11. The image processing device according to claim 1, wherein the one or more processors, when executing the instructions, further causes the image processing device to function as:
a fourth acquisition unit that acquires a color signal representing a color of the image;
a second determination unit that determines the printing amount of the color printing material based on the color signal; and
a second generation unit that generates the image data based on the printing amount of the color printing material,
wherein the second acquisition unit acquires the image data generated by the second generation unit.

12. The image processing device according to claim 1, wherein the image data is data composed of pixels, each of which has a pixel value representing the printing amount of the color printing material,
wherein the one or more processors, when executing the instructions, further causes the image processing device to function as:
a fifth acquisition unit that acquires mask data for identifying the third area and the fourth area of the second layer; and
a third generation unit that generates third area data having only pixel values of the third area and fourth area data having only pixel values of the fourth area based on the mask data,
wherein the halftone unit separately performs the halftone processing for the third area data and the fourth area data.

13. The image processing device according to claim 12, wherein the one or more processors, when executing the instructions, further causes the image processing device to function as:
an interpolation unit that interpolates the pixel values of the fourth area by using the pixel values of the third area in the third area data, and interpolates the pixel values of the third area by using the pixel values of the fourth area in the fourth area data,
wherein the halftone unit separately performs the halftone processing for the third area data and the fourth area data, the pixel values of the third and fourth area data having been interpolated by the interpolation unit as the image data.

14. The image processing device according to claim 1, wherein the gloss printing material is a clear ink.

15. The image processing device according to claim 14, wherein the first layer is a layer having a structure formed by the clear ink,
wherein the one or more processors, when executing the instructions, further causes the image processing device to function as:
a sixth acquisition unit that acquires an azimuth angle at a position at which the gloss intensity of the image is the highest;
a third determination unit that determines, based on the azimuth angle at which the gloss intensity is the highest, the printing amount of the clear ink for forming the structure in such a manner that an azimuth angle in a direction of an inclined surface of the structure becomes closer to the azimuth angle at which the gloss intensity is the highest; and
a fourth generation unit that generates the first dot arrangement data based on the printing amount of the clear ink,
wherein the first acquisition unit acquires the first dot arrangement data generated by the fourth generation unit.

16. The image processing device according to claim 1, wherein the one or more processors, when executing the instructions, further causes the image processing device to function as a forming unit that forms the first layer and the second layer based on the first dot arrangement data and the second dot arrangement data.

17. An image processing device that generates data for forming an image by layering, on a printing medium, a first layer having a first area, and a second area that differs in gloss characteristics from the first area, and a second layer having a third area corresponding to the first area, and a fourth area corresponding to the second area, the image processing device comprising:
one or more memories storing instructions; and
one or more processors which, when executing the instructions, causes the image processing device to function as:
a first acquisition unit configured to acquire first dot arrangement data corresponding to dot arrangement in the first layer formed by a gloss printing material for forming the first layer;
a second acquisition unit configured to acquire image data that indicates a printing amount of a color printing material for forming the second layer, and in which the printing amount of the color printing material differs between the third area and the fourth area;
a correction unit that corrects, based on the first dot arrangement data, diffusion coefficients of halftone processing performed for the image data by an error diffusion method; and
a halftone unit that performs the halftone processing of converting the image data into second dot arrangement data corresponding to dot arrangement of the color printing material on the printing medium by the error diffusion method that uses the diffusion coefficients corrected by the correction unit.

18. An image processing method of an image processing device that generates data for forming an image by layering, on a printing medium, a first layer having a first area, and a second area that differs in gloss characteristics from the first area, and a second layer having a third area corresponding to the first area, and a fourth area corresponding to the second area, the image processing method comprising:
a first acquisition step of acquiring first dot arrangement data corresponding to dot arrangement in the first layer formed by a gloss printing material for forming the first layer;
a second acquisition step of acquiring image data that indicates a printing amount of a color printing material for forming the second layer, and in which the printing amount of the color printing material differs between the third area and the fourth area; and
a halftone step of performing halftone processing of converting the image data into second dot arrangement data corresponding to dot arrangement of the color printing material on the printing medium based on the dot arrangement corresponding to the first dot arrangement data,
wherein the halftone step separately performs the halftone processing in the third area and the halftone processing in the fourth area based on the dot arrangement corresponding to the first dot arrangement data.

19. An image processing method of an image processing device that generates data for forming an image by layering, on a printing medium, a first layer having a first area, and a second area that differs in gloss characteristics from the first area, and a second layer having a third area corresponding to the first area, and a fourth area corresponding to the second area, the image processing method comprising:
a first acquisition step of acquiring first dot arrangement data corresponding to dot arrangement in the first layer formed by a gloss printing material for forming the first layer;
a second acquisition step of acquiring image data that indicates a printing amount of a color printing material for forming the second layer, and in which the printing amount of the color printing material differs between the third area and the fourth area;
a correction step of correcting, based on the first dot arrangement data, diffusion coefficients of halftone processing performed for the image data by an error diffusion method; and
a halftone step of performing the halftone processing of converting the image data into second dot arrangement data corresponding to dot arrangement of the color printing material on the printing medium by the error diffusion method that uses the diffusion coefficients corrected by the correction step.

20. A non-transitory computer-readable storage medium storing instructions that, when executed by a computer, cause the computer to perform a method comprising:
a first acquisition step of, from an image formed by layering, on a printing medium, a first layer having a first area, and a second area that differs in gloss characteristics from the first area, and a second layer having a third area corresponding to the first area, and a fourth area corresponding to the second area, acquiring first dot arrangement data corresponding to dot arrangement in the first layer formed by a gloss printing material for forming the first layer;
a second acquisition step of acquiring image data that indicates a printing amount of a color printing material for forming the second layer, and in which the printing amount of the color printing material differs between the third area and the fourth area; and
a halftone step of performing halftone processing of converting the image data into second dot arrangement data corresponding to dot arrangement of the color printing material on the printing medium based on the dot arrangement corresponding to the first dot arrangement data,
wherein the halftone step separately performs the halftone processing in the third area and the halftone processing in the fourth area based on the dot arrangement corresponding to the first dot arrangement data.

21. An image processing device that generates data for forming an image by layering, on a printing medium, a first layer having a first area, and a second area that differs in characteristics of a surface from the first area, and a second layer having a third area corresponding to the first area, and a fourth area corresponding to the second area, the image processing device comprising:
one or more memories storing instructions; and
one or more processors which, when executing the instructions, causes the image processing device to function as:
a first acquisition unit configured to acquire first dot arrangement data corresponding to dot arrangement in the first layer formed by a printing material for forming the first layer;
a second acquisition unit configured to acquire image data that indicates a printing amount of a color printing material for forming the second layer, and in which the printing amount of the color printing material differs between the third area and the fourth area; and
a halftone unit configured to perform halftone processing of converting the image data into second dot arrangement data corresponding to dot arrangement of the color printing material on the printing medium based on the dot arrangement corresponding to the first dot arrangement data,
wherein the halftone unit separately performs the halftone processing in the third area and the halftone processing in the fourth area based on the dot arrangement corresponding to the first dot arrangement data.

22. An image processing method of an image processing device that generates data for forming an image by layering, on a printing medium, a first layer having a first area, and a second area that differs in characteristics of a surface from the first area, and a second layer having a third area corresponding to the first area, and a fourth area corresponding to the second area, the image processing method comprising:
- a first acquisition step of acquiring first dot arrangement data corresponding to dot arrangement in the first layer formed by a printing material for forming the first layer;
- a second acquisition step of acquiring image data that indicates a printing amount of a color printing material for forming the second layer, and in which the printing amount of the color printing material differs between the third area and the fourth area; and
- a halftone step of performing halftone processing of converting the image data into second dot arrangement data corresponding to dot arrangement of the color printing material on the printing medium based on the dot arrangement corresponding to the first dot arrangement data,
- wherein the halftone step separately performs the halftone processing in the third area and the halftone processing in the fourth area based on the dot arrangement corresponding to the first dot arrangement data.

23. A non-transitory computer-readable storage medium storing instructions that, when executed by a computer, cause the computer to perform a method comprising:
- a first acquisition step of, from an image formed by layering, on a printing medium, a first layer having a first area, and a second area that differs in characteristics of a surface from the first area, and a second layer having a third area corresponding to the first area, and a fourth area corresponding to the second area, acquiring first dot arrangement data corresponding to dot arrangement in the first layer formed by a printing material for forming the first layer;
- a second acquisition step of acquiring image data that indicates a printing amount of a color printing material for forming the second layer, and in which the printing amount of the color printing material differs between the third area and the fourth area; and
- a halftone step of performing halftone processing of converting the image data into second dot arrangement data corresponding to dot arrangement of the color printing material on the printing medium based on the dot arrangement corresponding to the first dot arrangement data,
- wherein the halftone step separately performs the halftone processing in the third area and the halftone processing in the fourth area based on the dot arrangement corresponding to the first dot arrangement data.

* * * * *